United States Patent Office 3,448,704
Patented June 10, 1969

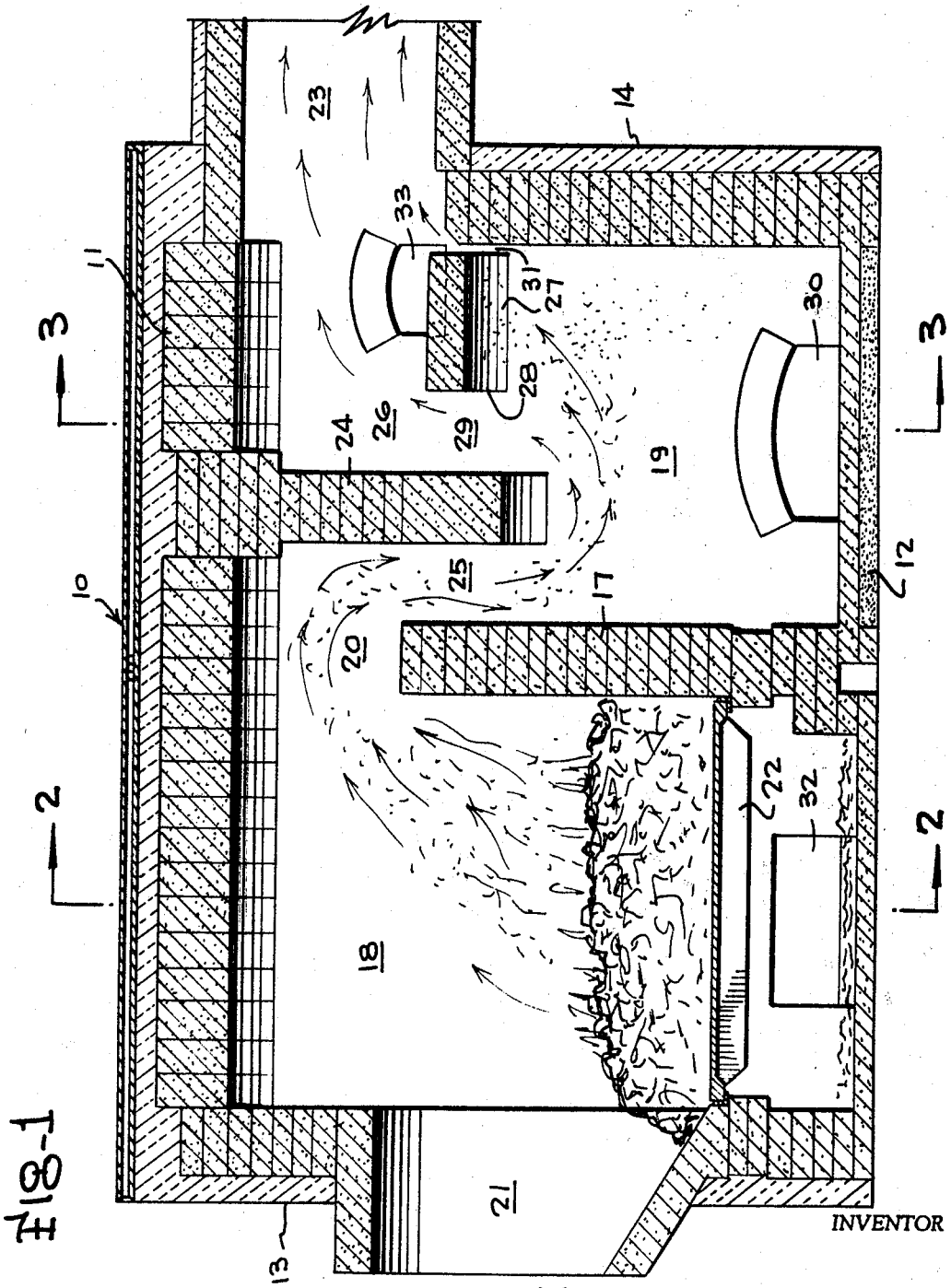

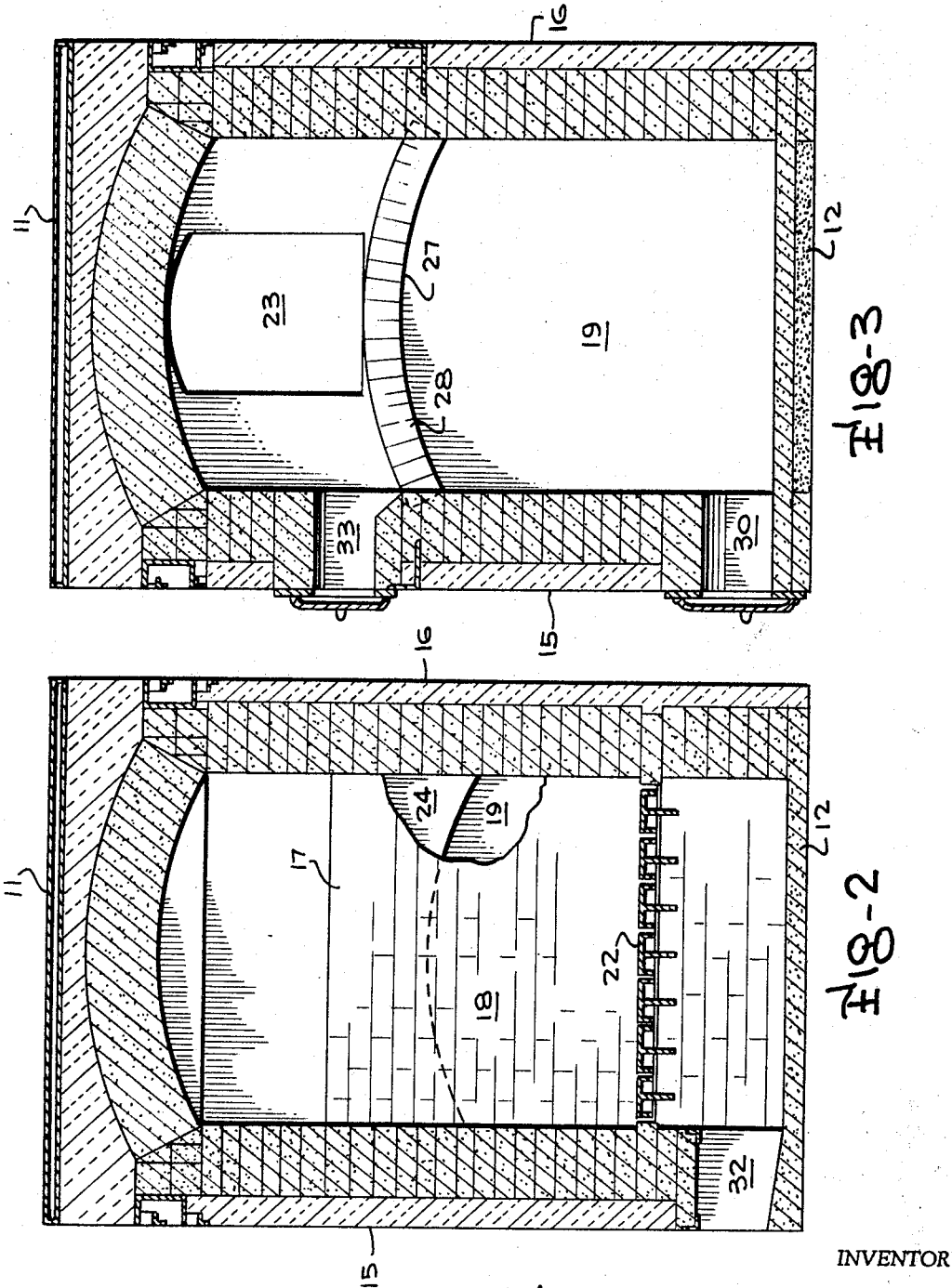

3,448,704
INCINERATOR AND FLY ASH SEPARATOR STRUCTURE THEREFOR
Miro Dvirka, Long Island City, N.Y., assignor to Hagan Industries, Incorporated, Corona, N.Y., a corporation of New York
Filed July 8, 1966, Ser. No. 563,807
Int. Cl. F23j *1/00*
U.S. Cl. 110—165                                    13 Claims

ABSTRACT OF THE DISCLOSURE

In an incinerator, a structure for separating solid particles from combustion gases comprising a settling chamber including inlet and outlet passageways being disposed relative to each other whereby combustion gases passing through the settling chamber describe a curved path about a center of curvature disposed between the passageways, the outlet passageway having an inlet disposed sufficiently adjacent the center of curvature whereby the solid particles of the gases passing through the settling chamber migrate along involute paths, impinging on a wall of the settling chamber and developing a high pressure zone therein and the settling chamber having a relief passageway intercommunicating the high pressure zone of the settling chamber and the exhaust flue of the incinerator.

---

This invention relates to an incinerator, and more particularly to an improved incinerator having novel structure for separating fly ash from the combustion gases thereof before the gases are exhausted through the flue of the incinerator into the atmosphere.

In most conventional, large capacity incinerators, such as commercial, industrial and municipal incinerators, the burning of refuse, to a certain extent, is incomplete resulting in the production of a considerable amount of fly ash, which is carried off by the combustion gases. Usually, the fly ash is carried by the combination gases through the flue of the incinerator and exhausted into the atmosphere, causing pollution of the atmosphere.

In the prior art, various different types of devices have been developed and utilized in incinerators to remove fly ash from the combustion gases before the gases are exhausted from the flue. Such devices, however, have been found to be uneconomical to construct and operate. Accordingly it has been desirable to develop a large capacity incinerator which is adapted to remove fly ash from the gases emanating from the combustion chamber, economically.

Therefore, it is the principal object of this invention to provide an improved incinerator.

Another object of the present invention is to provide an improved incinerator adapted to remove fly ash from the gases emanating from the combustion chamber of the incinerator, economically.

A further object of this invention is to provide an improved incinerator having a large capacity suitable for commercial, industrial and municipal uses, which is adapted to remove fly ash from the combustion gases, economically.

It is a further object of this invention to provide an improved incinerator which will produce a minimum of air pollution relative to comparable conventional incinerators.

Another object of the present invention is to provide an improved incinerator effective in removing fly ash from the combustion gases produced thereby, which is comparatively inexpensive to construct and economical to operate.

A further object of the present invention is to provide an improved incinerator having a novel structure for separating fly ash from the combustion gases thereof before the gases are exhausted through the flue of the incinerator into the atmosphere.

A still further object of the present invention is to provide an improved large capacity incinerator suitable for use in commercial, industrial and municipal uses, having novel structure for separating fly ash from the combustion gases thereof, which is comparatively simple in structure, inexpensive to construct and economical to operate.

Another object of this invention is to provide in an incinerator a novel structure for separating the fly ash from the combustion gases thereof, before such gases are exhausted through the flue of the incinerator into the atmosphere.

Other objects and advantages of the present invention will become more apparent to those persons skilled in the art from the following description taken in conjunction with the accompanying drawings, wherein:

FIGURE 1 is a vertical cross-sectional view of an embodiment of the invention;

FIGURE 2 is a cross-sectional view taken along line 2—2 in FIGURE 1; and

FIGURE 3 is a cross-sectional view taken along line 3—3 in FIGURE 1.

Briefly described, the present invention relates in an incinerator having a combustion chamber and a flue, a structure for separating fly ash or solid particles from combustion gases emanating from the combustion chamber, generally comprising a settling chamber including an inlet passageway and an outlet passageway, the inlet passageway communicating with the combustion chamber, and the outlet passageway communicating with the flue wherein the inlet passageway, the settling chamber, and the outlet passageway provide a continuous passageway for combustion gases emanating from the combustion chamber and exhausted through the flue into the atmosphere, the inlet and outlet passageways being disposed relative to each other, whereby combustion gases passing through the settling chamber describe a curved path about a center of curvature disposed between the passageways, the outlet passageway having an inlet disposed sufficiently adjacent the center of curvature, whereby the fly ash of the combustion gases passing through the settling chamber migrate along involute paths under the influence of centrifugal forces resulting from the motion of the combustion gases, impinging on a wall of the settling chamber and the settling chamber having a relief passageway communicating with the flue. In addition, the inlet of the outlet passageway may be disposed between the center of curvature and the inlet of the relief passageway, and the cross-sectional area of the relief passageway is no greater than five percent of the cross-sectional area of the flue. Preferably, the cross-sectional areas of the inlet and outlet passageways are substantially equal.

In accordance with another aspect of the invention, there is provided an incinerator generally comprising a housing structure including a front end wall, a rear end wall, upper and lower end walls, and side walls, the housing structure having a partition wall therein spaced from the front and rear end walls providing a combustion chamber and a settling chamber within the housing structure, the housing structure having means for charging refuse into the combustion chamber, the upper end of the partition wall terminating below the upper wall of the housing structure to provide a substantially horizontal passageway, a curtain wall depending from the upper wall of the housing structure between the partition wall and the rear end wall to provide a first vertical passageway intercommunicating the horizontal passageway and the settling chamber, and a second vertical passageway communicating with the settling chamber, a baffle member disposed in the second vertical passageway having the front end thereof spaced from the curtain wall to provide a restricted opening therebetween, the housing structure having a flue communicating with the second vertical passageway and the baffle member having a relief passageway disposed at the rear end thereof intercommunicating the settling chamber and the second vertical passageway. Preferably, the cross-sectional area of the relief passageway is no greater than five percent of the cross-sectional area of the flue of the incinerator. In addition, the cross-sectional areas of the restricted opening and the first vertical passageway are substantially equal, and the lower end of the baffle member is elevated relative to the lower end of the curtain wall.

Referring to the drawings, there is illustrated an embodiment of the invention. The embodiment includes a housing structure 10 having an upper wall 11, a lower wall 12, a front end wall 13, a rear end wall 14, and side walls 15 and 16. Disposed within the housing structure is a partition wall 17, which is spaced from the front end wall 13 and the rear end wall 14, providing a combustion chamber 18 and a settling chamber 19. The upper end of the partition wall 17 terminates below the lower side of the upper wall 11 to provide a horizontal passageway 20. The front end wall 13 is provided with a charging chute 21 communicating with the combustion chamber 18 through which refuse may be charged into the combustion chamber. The refuse is charged onto a grate 22, which is mounted in the lower end of the combustion chamber, spaced from the lower wall 12. The rear end wall 14 is provided with a horizontal extending flue 23.

Depending from the upper wall 11 and extending into the settling chamber 19 is a curtain wall 24. The lower end of the curtain wall projects below the upper level of the partition wall 17, and is spaced from the lower wall 12. In addition, the curtain wall 24 is spaced from the partition wall 17 and the rear end wall 14 to provide a first vertical passageway 25 and a second vertical passageway 26. As best illustrated in FIGURE 1, the vertical passageway 25 intercommunicates the horizontal passageway 20 and the settling chamber 19, and the vertical passageway 26 communicates with the settling chamber 19 and the flue 23. Accordingly, it will be seen that combustion gases emanating from the burning refuse on the grate 22 in the combustion chamber will rise and pass through the horizontal passageway 20, downwardly through vertical passageway 25, around the lower end of the curtain wall 24 in the settling chamber 19, describing a curved path, upwardly through vertical passageway 26 and horizontally through the flue 23 wherefrom they are exhausted into the atmosphere.

Mounted in the vertical passageway 26 is a baffle member 27 having the front end 28 thereof spaced from the curtain wall 24 to provide a restricted passageway 29 between the baffle member and the curtain wall. The lower end of the baffle member 27 is elevated relative to the lower end of the curtain wall 24, and the cross-sectional areas of the vertical passageway 25, and the restricted passageway 29 preferably are substantially equal.

In the operation of the embodiment illustrated in the drawings, when refuse is burned in the combustion chamber 18, the combustion gases emanating from the combustion chamber will carry a certain amount of fly ash through passageways 20 and 25 into the settling chamber 19. The motion of the gases flowing around the lower end of the curtain wall 24 in the settling chamber 19 result in centrifugal forces causing the fly ash particles to follow involute paths of increasing radii from the center of curvature located at the lower end of the curtain wall. As a result of the fly ash particles migrating along involute paths caused by centrifugal forces, gases free of fly ash will follow curved paths of small radii, through the restricted passageway 29, vertical passageway 26, and flue 23, to be exhausted into the atmosphere. The fly ash particles, however, following involute paths of increased radii will impinge upon the lower side of the baffle member 27, causing them to drop to the floor of the settling chamber. Fly ash accumulated on the floor of the settling chamber can be removed through a clean out door 30.

The flow of gases obstructed by the baffle member 27 normally would develop increased pressures in the settling chamber 19, which would disturb the separation process as previously described. These increased pressures in the settling chamber, however, are eliminated by means of a relief passageway 31, provided in the rear end of the baffle member 27, which intercommunicates the settling chamber 19 and the flue 23. For efficient operation of the incinerator, the cross-sectional area of the relief passageway 31 should be no greater than about five percent of the cross-sectional area of the flue 23.

The housing structure 10, the partition wall 17, the curtain wall 24, and the baffle member 27 can be constructed of any suitable materials, although, preferably, such members would be constructed of fire brick. The side wall 15 also is provided with a cleanout opening 32, through which ash at the bottom of the combustion chamber 18 may be removed, and a cleanout opening 33 providing access to the upper end of the baffle member 27 and the flue 23.

It will be appreciated from the foregoing description of the construction and operation of the present invention, that a greater portion of the fly ash carried with the gases emanating from the combustion chamber, will be caused to be separated from the gases prior to such gases being exhausted through the flue into the atmosphere. The ash can be collected in the settling chamber and removed periodically.

From the foregoing detailed description it will be evident that there are a number of changes, adaptations and modifications of the present invention which come within the province of those skilled in the art. However, it is intended that all such variations not departing from the spirit of the invention be considered as within the scope thereof as limited solely by the appended claims.

What I claim is:

1. An incinerator comprising a combustion chamber, a settling chamber, a flue, said settling chamber having an upwardly extending vertical inlet passageway communicating with said combustion chamber and an upwardly extending vertical outlet passageway communicating with said flue wherein said inlet passageway, said settling chamber and said outlet passageway provide a continuous passageway for combustion gases emanating from said combustion chamber and exhausted through said flue, said inlet and outlet passageways being spaced apart a predetermined distance whereby combustion gases passing through said settling chamber describe a curved path about a center of curvature disposed between said passageways, said outlet passageway having an inlet disposed sufficiently adjacent said center of curvature whereby said solid particles of said combustion gases passing through said settling chamber migrate along involute paths under the influence of the centrifugal field produced by said curved path of said combustion gases, impinging a wall of said settling chamber and said settling chamber and producing a high pressure zone therein having a relief passageway intercommunicating said high pressure zone and said flue.

2. An incinerator according to claim 1, wherein said inlet of said outlet passageway is disposed between said center of curvature and the inlet of said relief passageway.

3. An incinerator according to claim 1, wherein the cross-sectional area of said relief passageway is no greater than five percent of the cross-sectional area of said flue.

4. An incinerator according to claim 1, wherein said inlet of said outlet passageway is disposed between said center of curvature and the inlet of said relief passageway, and the cross-sectional area of said relief passageway is no greater than five percent of the cross-sectional area of said flue.

5. An incinerator according to claim 1, wherein the lower end of said outlet passageway is elevated relative to the lower end of said inlet passageway.

6. An incinerator according to claim 1, wherein the cross-sectional areas of said inlet and outlet passageways are substantially equal.

7. An incinerator according to claim 1, wherein the lower end of said outlet passageway is elevated relative to the lower end of said inlet passageway, and the cross-sectional areas of said inlet and outlet passageways are substantially equal.

8. An incinerator comprising a housing structure including a front end wall, a rear end wall, upper and lower walls and side walls, said housing structure having a partition wall therein spaced from said front end wall providing a combustion chamber between said partition wall and said front end wall, and a settling chamber between said partition wall and said rear end wall, said housing structure having means for charging matter into said combustion chamber, the upper end of said partition wall terminating below said upper wall to provide a substantially horizontal passageway, a curtain wall depending from said upper wall between said partition wall and said rear end wall to provide a first vertical passageway intercommunicating with said horizontal passageway and said settling chamber, and a second vertical passageway communicating with said settling chamber, a baffle member disposed in said second vertical passageway having the front end thereof spaced from said curtain wall to provide a restricted opening therebetween, said housing structure having a flue communicating with said second vertical passageway and said baffle member having a relief passageway disposed at the rear end thereof intercommunicating said settling chamber and said second vertical passageway.

9. An incinerator according to claim 8, wherein the cross-sectional area of said relief passageway is no greater than five percent of the cross-sectional area of said flue.

10. An incinerator according to claim 8, wherein the cross-sectional areas of said restricted opening and said first vertical passageway are substantially equal.

11. An incinerator according to claim 8, wherein the lower end of said baffle member is elevated relative to the lower end of said curtain wall.

12. An incinerator according to claim 8, wherein the cross-sectional areas of said restricted opening and said first vertical passageway are substantially equal, and the lower end of said baffle member is elevated relative to the lower end of said curtain wall.

13. An incinerator according to claim 12, wherein said flue is disposed in the upper end of said rear end wall.

References Cited
UNITED STATES PATENTS

| | | |
|---|---|---|
| 617,521 | 1/1899 | Day. |
| 648,359 | 4/1900 | Moulton _____ 110—59 |
| 824,497 | 6/1906 | Mark. |
| 3,097,631 | 7/1963 | Martin _____ 122—235 |

FOREIGN PATENTS

| | | |
|---|---|---|
| 851,391 | 10/1952 | Germany. |
| 149,042 | 11/1931 | Switzerland. |

FREDERICK L. MATTESON, Jr., *Primary Examiner.*

H. B. RAMEY, *Assistant Examiner.*